United States Patent
Kushwaha et al.

(10) Patent No.: US 10,798,029 B2
(45) Date of Patent: Oct. 6, 2020

(54) SYSTEM AND APPARATUS FOR GENERATION OF MULTIPLE AUTOMATED EPHEMERAL CHAT MESSAGES

(71) Applicant: Freshworks Inc., San Bruno, CA (US)

(72) Inventors: Ajeet Singh Kushwaha, Lucknow (IN); Rahul Agarwal, Dehradun (IN); Rimaljit Kaur, Patalia (IN)

(73) Assignee: Freshworks, Inc., San Mateo, CA (US)

(*) Notice: Subject to any disclaimer, the term of this patent is extended or adjusted under 35 U.S.C. 154(b) by 375 days.

(21) Appl. No.: 15/722,376

(22) Filed: Oct. 2, 2017

(65) Prior Publication Data

US 2019/0036850 A1    Jan. 31, 2019

(30) Foreign Application Priority Data

Jul. 25, 2017  (IN) .............................. 201741026351

(51) Int. Cl.
*G06F 15/16* (2006.01)
*H04L 12/58* (2006.01)
*H04L 29/08* (2006.01)

(52) U.S. Cl.
CPC .............. *H04L 51/02* (2013.01); *H04L 51/04* (2013.01); *H04L 51/043* (2013.01); *H04L 51/046* (2013.01); *H04L 67/02* (2013.01); *H04L 51/22* (2013.01)

(58) Field of Classification Search
USPC ........................................................ 709/206
See application file for complete search history.

(56) References Cited

U.S. PATENT DOCUMENTS

| | | | |
|---|---|---|---|
| 10,270,865 B1* | 4/2019 | Heath | H04L 51/04 |
| 2007/0245249 A1* | 10/2007 | Weisberg | G06F 9/451 |
| | | | 715/758 |
| 2013/0066987 A1* | 3/2013 | Levinson | H04L 51/04 |
| | | | 709/206 |
| 2013/0066988 A1* | 3/2013 | Levinson | G06Q 10/107 |
| | | | 709/206 |
| 2013/0073636 A1* | 3/2013 | Zhu | H04L 12/1818 |
| | | | 709/206 |
| 2015/0254561 A1 | 9/2015 | Singal et al. | |
| 2016/0044083 A1 | 2/2016 | Galloway et al. | |
| 2016/0247213 A1* | 8/2016 | Lee | G06Q 30/0617 |
| 2016/0352659 A1* | 12/2016 | Krishnamoorth | H04L 51/046 |

(Continued)

FOREIGN PATENT DOCUMENTS

EP    3211840 A1 *  8/2017  ............. H04L 51/16

*Primary Examiner* — Anthony Mejia
(74) *Attorney, Agent, or Firm* — LeonardPatel PC; Sheetal S. Patel; Michael A. Leonard, II

(57) ABSTRACT

A computer-implement process generally pertains to ephemeral chat messaging, and in particular, maintaining context of a conversation between a BOT and a user from one webpage of a web browser to another webpage of the web browser. The computer-implemented process includes adding a message to a chat widget. The chat widget is displayed within the webpage of the web browser and the message being added is from the other webpage that the user responded to. The computer-implemented process also includes discarding one or more previous messages in the chat widget that are not responded to by the user, allowing the conversation between the BOT and the user to persist while retaining the context of the conversation from the other webpage.

18 Claims, 6 Drawing Sheets

(56) References Cited

U.S. PATENT DOCUMENTS

| | | | |
|---|---|---|---|
| 2017/0048170 A1* | 2/2017 | Smullen | H04L 67/306 |
| 2017/0250936 A1* | 8/2017 | Rosenberg | H04L 51/18 |
| 2017/0295114 A1* | 10/2017 | Goldberg | G06N 20/00 |
| 2018/0083894 A1* | 3/2018 | Fung | H04L 51/02 |
| 2018/0103073 A1* | 4/2018 | Rosenberg | H04L 67/141 |
| 2018/0248818 A1* | 8/2018 | Zucker | H04L 67/22 |
| 2018/0255006 A1* | 9/2018 | Kamat | H04L 51/02 |
| 2018/0287968 A1* | 10/2018 | Koukoumidis | G06F 16/248 |
| 2019/0089697 A1* | 3/2019 | Delaney | G06Q 20/401 |

* cited by examiner

SYSTEM AND APPARATUS FOR GENERATION OF MULTIPLE AUTOMATED EPHEMERAL CHAT MESSAGES

FIELD

The present invention relates to message delivery, and more particularly, to message delivery by way of chat interfaces.

BACKGROUND

Current products, such as ZOPIM™, OLARK™, FRESHCHAT™, etc., that are mostly web-based chat products do not have the capability to persist and synchronize messages to which the user responds. For example, when a user is on a webpage, messages can be delivered to the user based on the user's context. User's context includes user information collected from the web browser, his or her browsing pattern, the HyperText Markup Language (HTML) elements of the webpage (e.g., a user's information can be read through the webpage's elements such as title or name, or category of the page). Internet Protocol (IP) address of the user, etc.

However, selective persistence (i.e., persistence of messages in a chat window on the basis of user response) of these messages is missing. It is also difficult for a user to decipher and track if a current conversation is active when there are different targeted messages per new webpage or tab. The current products limit the capability of contextual engagement, which is an effective way of targeting and/or assisting a user.

Thus, an alternative message delivery system may be beneficial.

SUMMARY

Certain embodiments of the present invention may provide solutions to the problems and needs in the art that have not yet been fully identified, appreciated, or solved by current web-based chat products.

In one embodiment, a computer-implement process pertains to maintaining context of a conversation between a BOT and a user from one webpage of a web browser to another webpage of the web browser. The computer-implemented process includes adding a message to a chat widget. The chat widget is displayed within the webpage of the web browser and the message being added is from the other webpage that the user responded to. The computer-implemented process also includes discarding one or more previous messages in the chat widget that are not responded to by the user, allowing the conversation between the BOT and the user to persist while retaining the context of the conversation from the other webpage.

In another embodiment, a computer-implemented process pertains to synchronizing messages among a plurality of webpages in a web browser. The computer-implemented process includes displaying a chat widget for each of the plurality of webpages opened in the web browser. The chat widget includes one or more messages pertaining to a corresponding webpage. The computer-implemented process also includes when a user responds to a message in one of the chat widgets, discarding the one or more messages in other chat widgets that the user has not responded to. The computer-implemented process further includes updating the chat widgets to include the user response message and a visual separator, thereby synchronizing messages among the plurality of webpages in the web browser.

In yet another embodiment, a computer-implemented process pertains to synchronizing messages among a plurality of webpages in a web browser. The computer-implemented process includes checking if a message belongs to a webpage that is currently being viewed by a user. The computer-implemented process also includes checking if the message should be preceded by a visual separator prior to insertion of the message into a chat widget. The computer-implemented process further includes adding the message to the chat widget, when the message belongs to the webpage, and discarding previous message or messages in the chat widget that are not responded to by the user.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

In some embodiments, the system may generate multiple messages that are context aware and dynamic in nature. As explained above, contextual awareness is created using elements that are dynamic by their very nature. These elements may include user browsing pattern, the HTML elements of the webpage (e.g., user's information can be read through the webpages' elements such as title or name or category of the page). IP address of the user, etc.

In certain embodiments, messages are delivered to the user while he or she is browsing different webpages. Using this technique, messages are treated to be ephemeral and only the messages that the user responds to persist. Also, once the user engages in a conversation on a chat widget (or window) displayed on a webpage, the chat widget may synchronize to all other webpages (of that particular domain). The other webpages are where the user is currently browsing. This essentially allows the user to continue his communication from any webpage.

Certain embodiments may manipulate the web browser to initially deliver multiple different messages (based on context) to multiple webpages and persist only with the messages to which the user responds. In some further embodiments, the web browser is configured to synchronize conversations from one webpage to another with a visual cue (such as a line separator) for the user on all different webpages. Once the conversation with the user has come to its logical conclusion (determined by the business offering of the chat service or by the user expressing his or her desire to end the conversation), the message delivery system may resume sending different messages to the user based on context.

The embodiments may give businesses the ability to target and/or assist users with contextual messages while maintaining the context of the conversation even when the user switches from one tab to another in a web browser. Simply stated, even though the user receives various messages, the context of the messages on each webpage is maintained as there are different messages on different webpages. The visual cue may help maintain the context when the conversations should be synced. Technically, the system may allow users to have sessions per webpage and an ability to merge/synchronize these sessions. Each webpage may receive different messages allowing the user to choose which message he or she wants to respond to, and the synchronization lets the user continue the chat from any webpage in the web browser.

Figure 1:
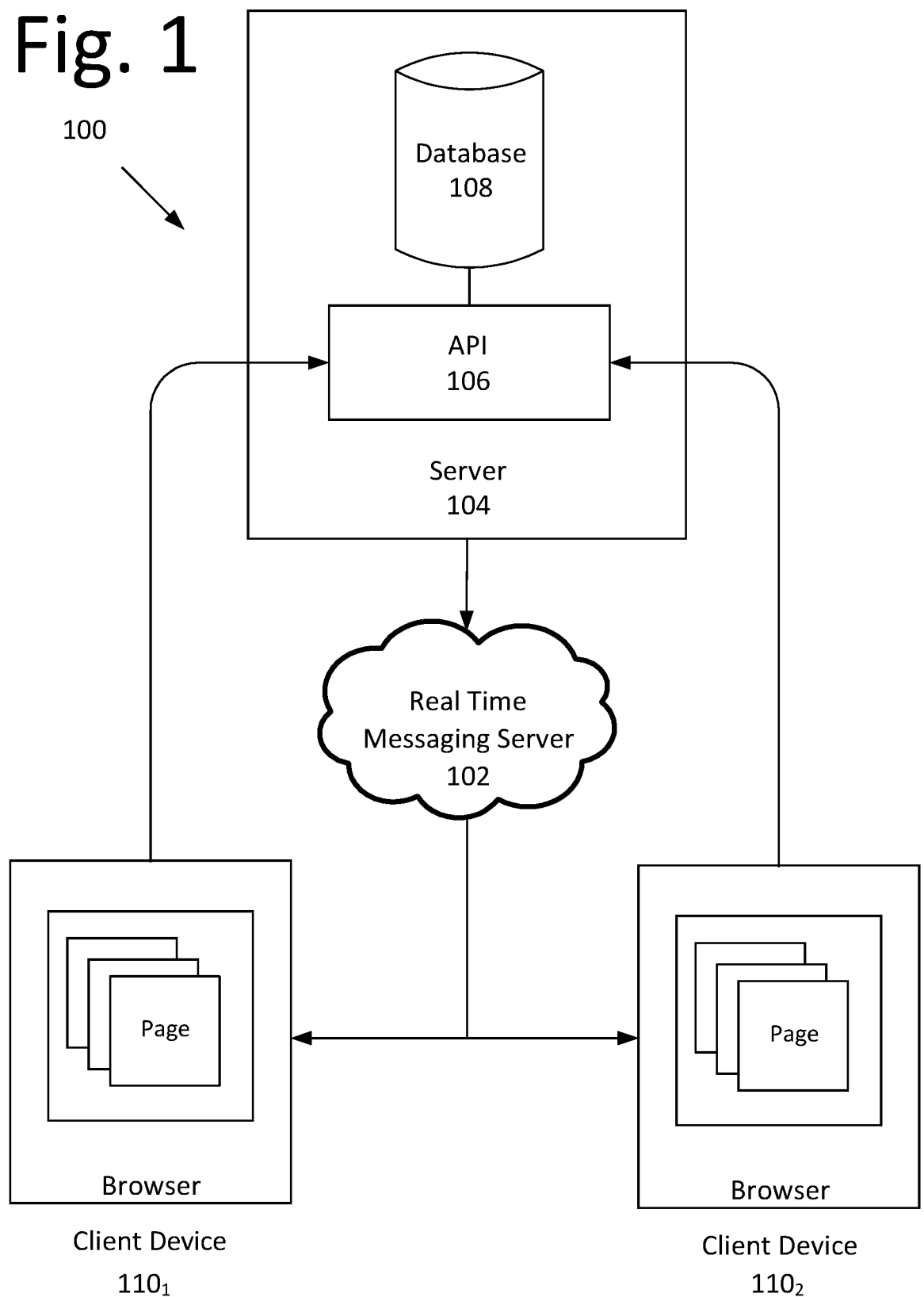
FIG. 1 is a block diagram a system architecture for enabling and performing real-time messaging, according to an embodiment of the present invention.

FIG. 1 is a block diagram illustrating a system architecture 100 for enabling and performing real-time messaging, according to an embodiment of the present invention. In this embodiment, an application server 104 is connected to a real-time messaging server 102 and client devices $110_1$ and $110_2$. Application server 104 may include an application programming interface (API) 106 for determining which message that should be sent to the user and a database 108 for storing messages to which the user responded to.

In this embodiment, a user may use his or her client device $110_1$, $110_2$ to access a web browser. The web browser may include multiple tabs that the user can access. Each tab may display a webpage for a commerce site, for example. Each webpage may include a chat widget allowing for messaging between real-time messaging server and the user.

When the user is viewing one or more webpages, client devices $110_1$ and $110_2$ may communicate the context of the one or more webpages to application server 104. In response, application server 104 may respond to real-time messaging server 102. For example, application server 104 may send the complete message to real-time messaging server 102, and real-time messaging server 102 may act as a delivery mechanism for application server 104. A more detailed description will be described below with respect to FIG. 5.

Real-time messaging server 102 may deliver messages to client devices $110_1$, $110_2$. These messages are delivered in form of JavaScript Object Notation (JSONs), for example. The message may include three parts, which are described in more detail below with respect to FIG. 5. As a high-level example, the message may include instructions as to whether the message should be shown to the user of client devices $110_1$ and/or the user of $110_2$, or in certain embodiments, which chat widget the body of the message should be displayed on. For example, the message may include a page identification (ID). The page ID is created at the time of loading the chat widget, for example. So, depending on the page ID, each webpage determines whether the message should be shown.

As noted above, there are multiple webpages in a web browser. Each webpage may have a connection with real-time messaging server 102. Application server 104 may deliver the message, including the JSON payload, to real-time messaging server 102. Real-time messaging server 102 is primarily responsible for delivering the message (or JSON payload) to all webpages that are currently open in a web browser.

Figure 2:
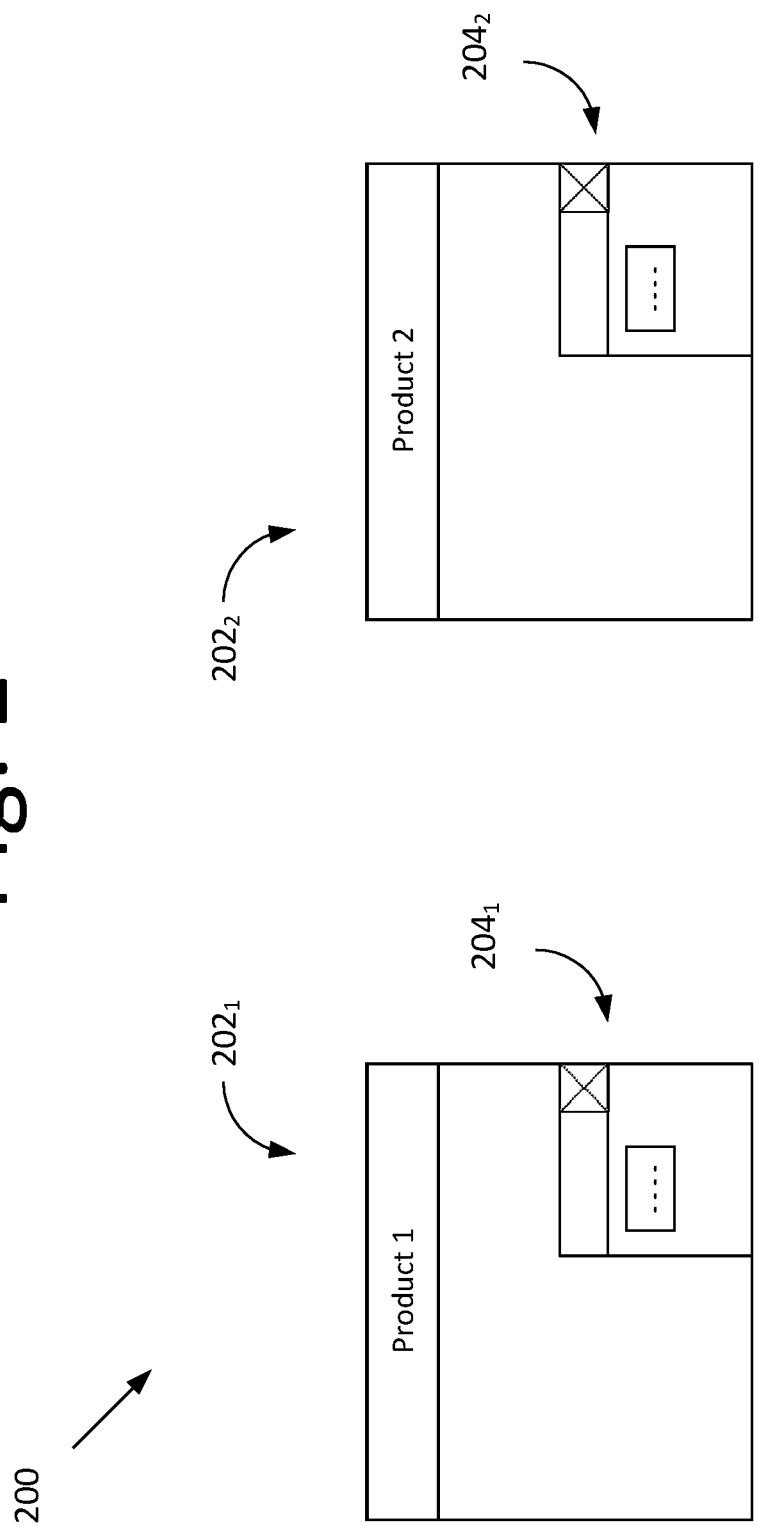
FIG. 2 is a graphical representation for initiating a conversation on one or more webpages of a web browser, according to an embodiment of the present invention.

FIG. 2 is a graphical representation 200 for initiating a conversation on one or more webpages of a web browser, according to an embodiment of the present invention. In an embodiment, a user (or customer) may land on a commerce website, and browse for a few products using multiple webpages (or tabs) in the web browser. In this example, let's assume that the user is browsing for two separate products (Product 1 and Product 2) on two separate webpages $202_1$, $202_2$ in a web browser. When the user arrives at Product 1 in first webpage (or tab) $202_1$, a welcome message may appear in a chat widget $204_1$. For example, the welcome message may in some embodiments invite the user to purchase Product 1 or engage in a series of questions and answers related to Product 1. It should be appreciated, however, that the embodiments described herein are not limited to the welcome message, and any messaged, based on the context of the webpage, may appear in chat widget $204_1$ and/or $204_2$.

Based on the user response (or conditions), chat widget $204_1$ may remain (i.e., persist) or vanish, and therefore, is considered ephemeral. Further, the vanished message may not be stored within the real-time messaging server. For purposes of explanation only, a chat message may vanish if a user does not respond to the chat message, and in turn, responds to some other message on another webpage. For examples, let's assume that a user opens two webpages $202_1$ (e.g., a buy now page) and $202_2$ (e.g. a pricing page) in different tabs. The user may receive different messages in chat widgets $204_1$ and $204_2$. Continuing with the example, the user may receive the following message in chat widget $204_1$ for webpage $202_1$—"Read how people benefited by this server.", and the user may receive the following message in chat widget $204_2$ for webpage $202_2$—"Let us help you choose the right plan for you.". When a user responds to one of these messages, the other non-responded to message may vanish, and the responded to message may persist. Further, if the user continues opening different webpages in the same tab, or in some embodiments in different tabs, and the user does not respond to the BOT messages, the BOT messages continue to vanish and new ones continue to pop up.

While keeping webpage $204_1$ open for Product 1, the user may open a new tab for a second webpage $204_2$ within the same web browser. This second webpage $204_2$ may be for a second (or different) product, i.e., Product 2. The user at this point may receive a chat message in chat widget $204_2$. This chat message may inquire the user if he or she would like assistance with the purchase of, or would like further information related to, Product 2, for example.

Figure 3:
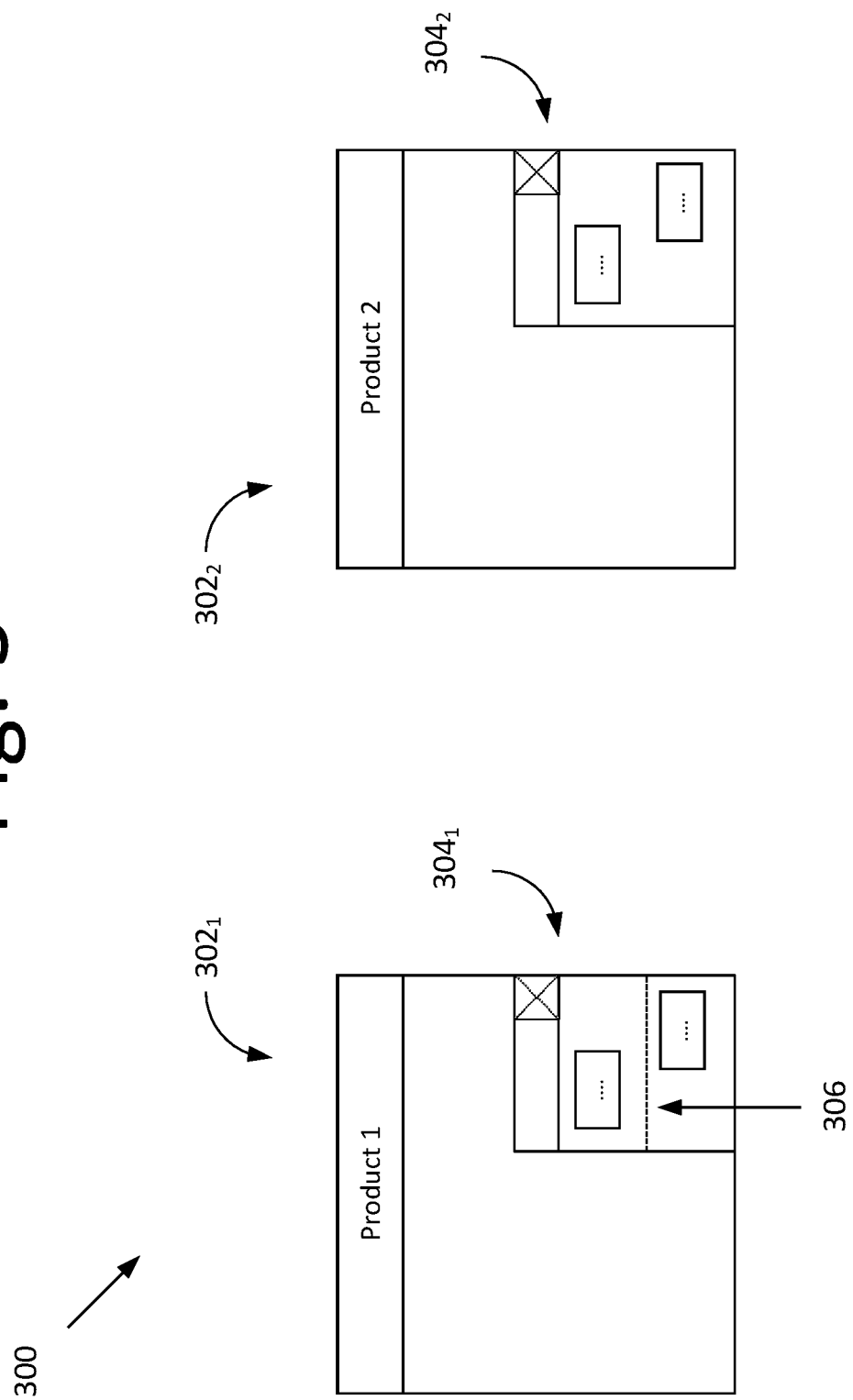
FIG. 3 is a graphical representation for synchronizing a conversation when a user responds to a chat message in one of the webpages in the web browser, according to an embodiment of the present invention.

FIG. 3 is a graphical representation 300 for synchronizing a conversation when a user responds to a chat message in one of the webpages in the web browser, according to an embodiment of the present invention. In graphical representation 300, a user may have two separate webpages $302_1$ and $302_2$ open in the web browser for the same commerce website, and may be viewing two separate products, Product 1 and Product 2. Both webpages $302_1$ and $302_2$ in this embodiment may have a chat widget $304_1$, $304_2$ open.

Like FIG. 2, chat widgets $304_1$, $304_2$ may display a chat message to the user. The user may respond to the chat message (or a product inquiry) in chat window $304_1$ or to the chat message (or a product inquiry) in chat widget $304_2$. For example, let's assume that the user responds to the chat message in chat widget $304_2$ requesting for further information regarding Product 2. Continuing with this example, chat widget $304_1$ may vanish upon the user refreshing webpage $302_1$, and in some embodiments, insert a line separator 306 showing a change in topic from Product 1 to Product 2. The chat message that is responded to may be stored in the application server 104, and more specifically, in database 108 of FIG. 1, while the chat messages in the other webpages may be removed or deleted from the database, for example.

This allows the user to continue the conversation via the chat widget from one webpage to another webpage in the web browser while retaining the context of the conversation. For example, the user may continue his or her conversation regarding a second product on a different webpage even though he or she is viewing a different product on the different webpage. Specifically, to this embodiment, the conversation between the user and the real-time messaging server, for example, may continue from chat widget $304_2$ in webpage $302_2$ to chat widget $304_1$ in webpage $302_1$.

It should be appreciated that a conversation may end in more than one way, and may be defined by the business itself. For example, a conversation may come to a logical end when the user decides he or she would like to purchase the product. Another logical end may be when the conversation times-out, i.e., when there is no activity between the user and the real-time messaging server for a predefined period of time. In yet another example, a logical end may be defined as when the application server decides that the conversation has come to an end. In an embodiment where the real-time messaging server includes logic, the real-time messaging server may decide when the conversation has come to an end.

Figure 4:
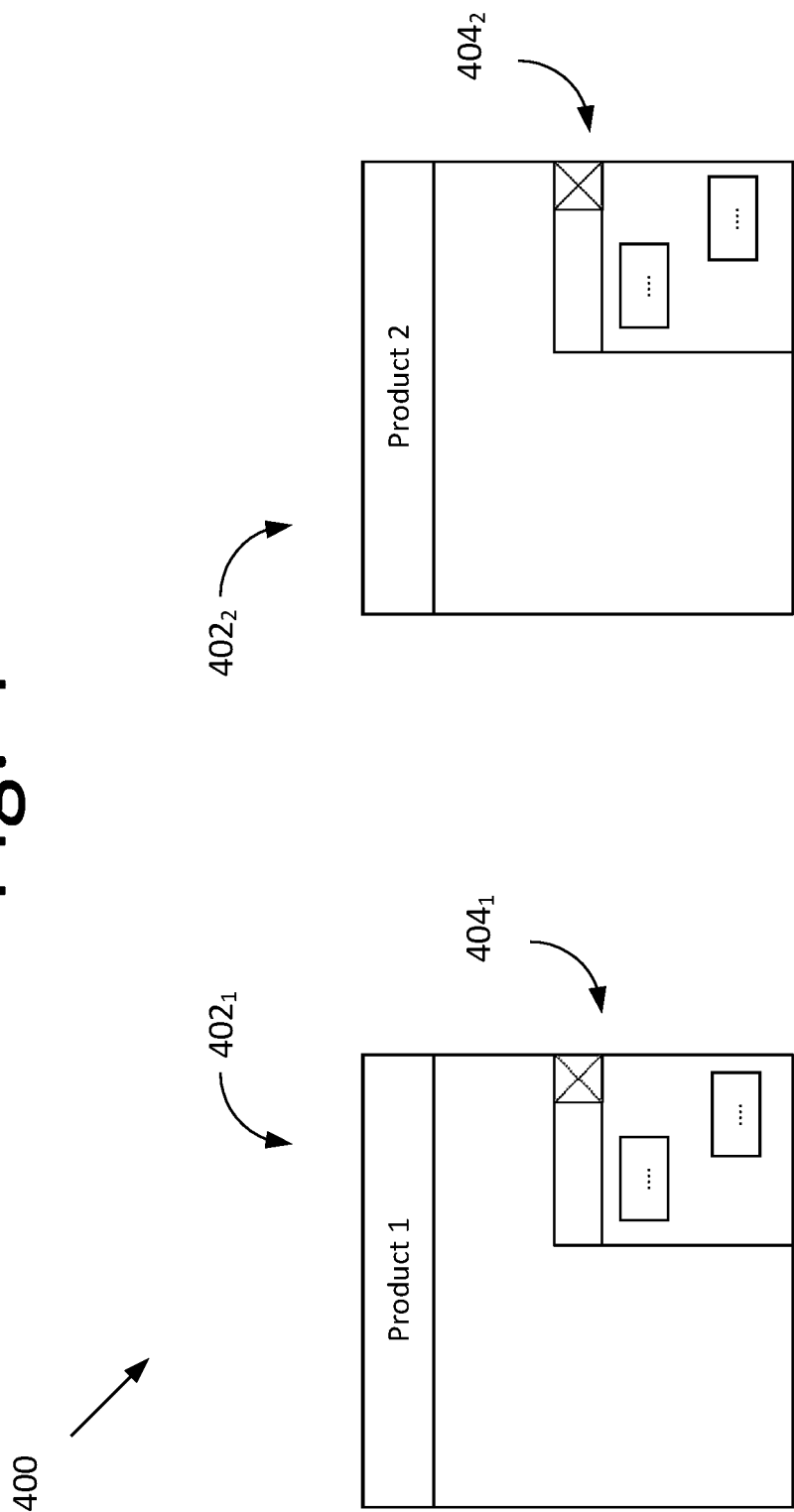
FIG. 4 is a graphical representation for synchronizing a conversation when a user opens one or more webpages in a web browser, according to an embodiment of the present invention.

FIG. 4 is a graphical representation 400 for synchronizing a conversation when a user opens one or more webpages in a web browser, according to an embodiment of the present invention. In some embodiments, when a user refreshes his or her webpage, the chat widget for that webpage disappears and is no longer stored. Hence, the chat messages are ephemeral. However, in certain embodiments, chat widget (including the chat messages) from another webpage may appear in the current chat widget for the current webpage. Hence, the term ephemeral.

For example, let's assume that the user while viewing Product 1 in webpage $402_1$, responds to the chat message in chat widget $404_1$. Further, let's assume that the user while viewing Product 1, opens a new webpage $402_2$ in a different tab of the web browser. In this example, when the user open webpage $402_2$ to view Product 2, a chat widget $404_2$ may be shown. In certain embodiments, chat widget $404_2$ may include chat messages from chat widget $404_1$, thereby continuing the conversation from the previous webpage. In some further embodiments, when the user refreshes webpage $402_2$, the chat messages from chat widget $404_1$ is imported into, and/or displayed on, chat widget $404_2$.

Simply put, the system may deliver N number of messages to the user depending on one or more conditions. One of the conditions may include browsing on different webpages or opening two different tabs, and refreshing one of the webpages. This may further include storing chat messages that the user responded to, thereby removing or deleting those messages in the webpages that the user has not responded to. In some embodiments, and as discussed above in the earlier paragraphs, a line separator is used in the chat widget(s) to show the most recent and relevant chat message(s) and to show a change of context while synchronizing the message(s) from one webpage/window to the other.

Figure 5:
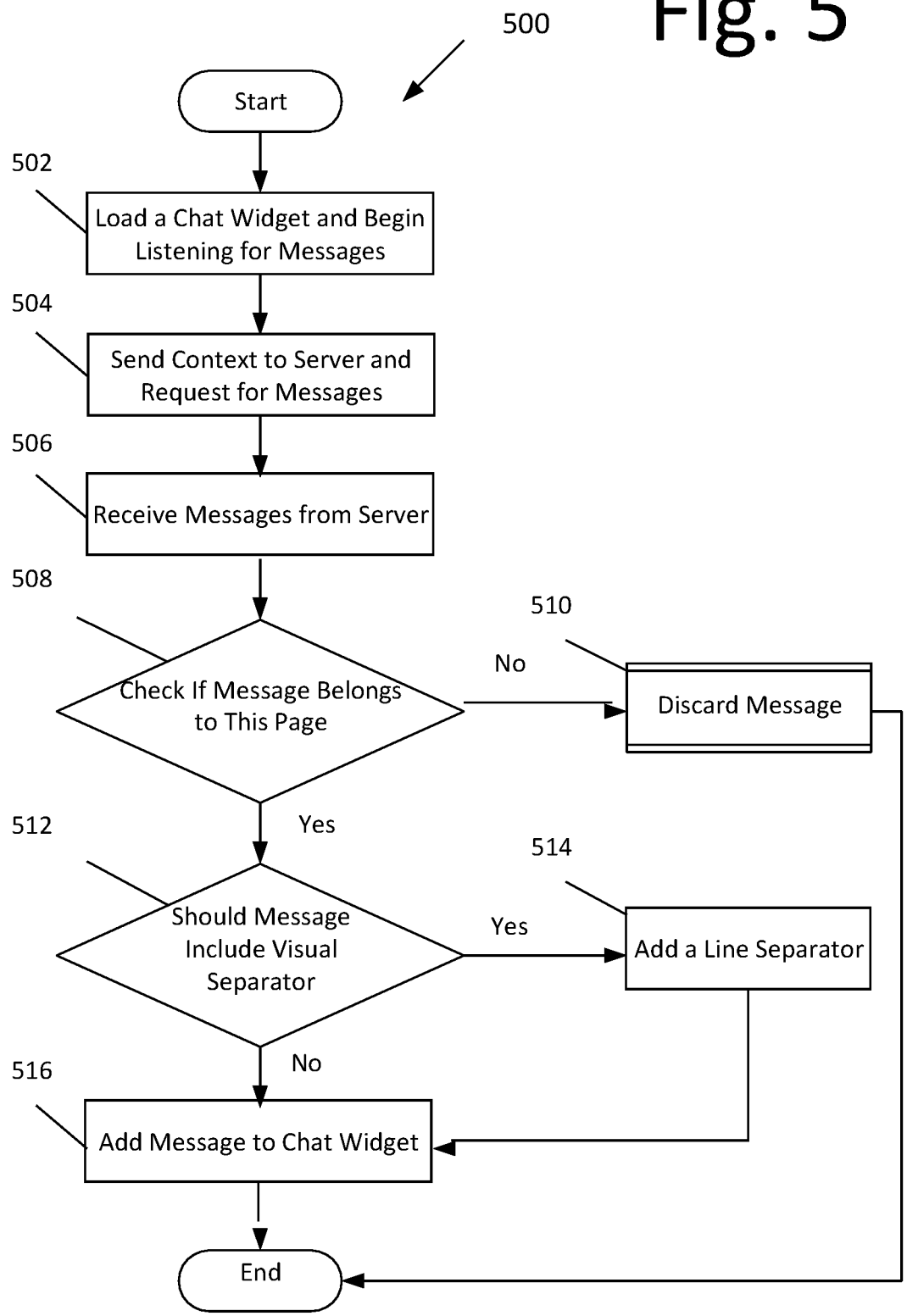
FIG. 5 is a flow diagram illustrating a process for synchronizing a conversation among multiple webpages in a web browser, according to an embodiment of the present invention.

FIG. 5 is a flow diagram 500 illustrating a process for synchronizing a conversation among multiple webpages in a web browser, according to an embodiment of the present invention. In this embodiment, the process may begin at 502 with the web browser loading a chat widget for a webpage, and also, begins listening for messages from real-time messaging server. Chat widget in some embodiments may refer to a chat window or session between the real-time messaging server and the user.

In certain embodiments, the web browser may begin listening when the webpage loads a particular product, for example. The process of loading may occur on two separate tabs showing parallel webpages. The message that should be sent to the user viewing the webpages on separate tabs is determined by the API of application server 104 of FIG. 1.

After the widget is loaded, the web browser sends for each webpage context information to the server (which includes the API and database), and sends a message request to the real-time application server by way of the server, at 504. Context information in some embodiments is sent along with the message request, and may include the IP, the uniform resource locator (URL), and the product name, which may be fetched from the HTML elements. The request may include a request for a message to load in a chat widget from the application server.

At 506, the web browser receives a message from the real-time application server. For example, the message may include a session identifier that is unique to each webpage, and therefore, creates a session per webpage. Further, the session per page may refer to the message that should be displayed along with the message metadata. The message metadata may include a timestamp and properties that would govern how the message is displayed.

At 508, the webpage checks if the received message is to be shown, i.e. which webpage should display the received message. For example, to check if the message is to be shown, the received message includes a message hash or a session hash. The message hash or session hash identifies the webpage and indicates where the message belongs. If the message does not belong to the webpage that the user is viewing, the message is discarded at 510, and the process ends.

Otherwise, the process continues to 512. At 512, the web browser determines if the message should include, or otherwise be preceded by, a visual (or line) separator. The visual separator may be used when the user has responded to a message from another webpage, and the user is now on a different webpage viewing another product. In this case, the web browser adds a line separator at 514, and adds the message to the chat widget at 516, continuing the conversation from the previous webpage (or tab). If, however, a visual separator is not to be added, the web browser at 516 adds the message to the chat widget persisting with the same conversation.

Figure 6:
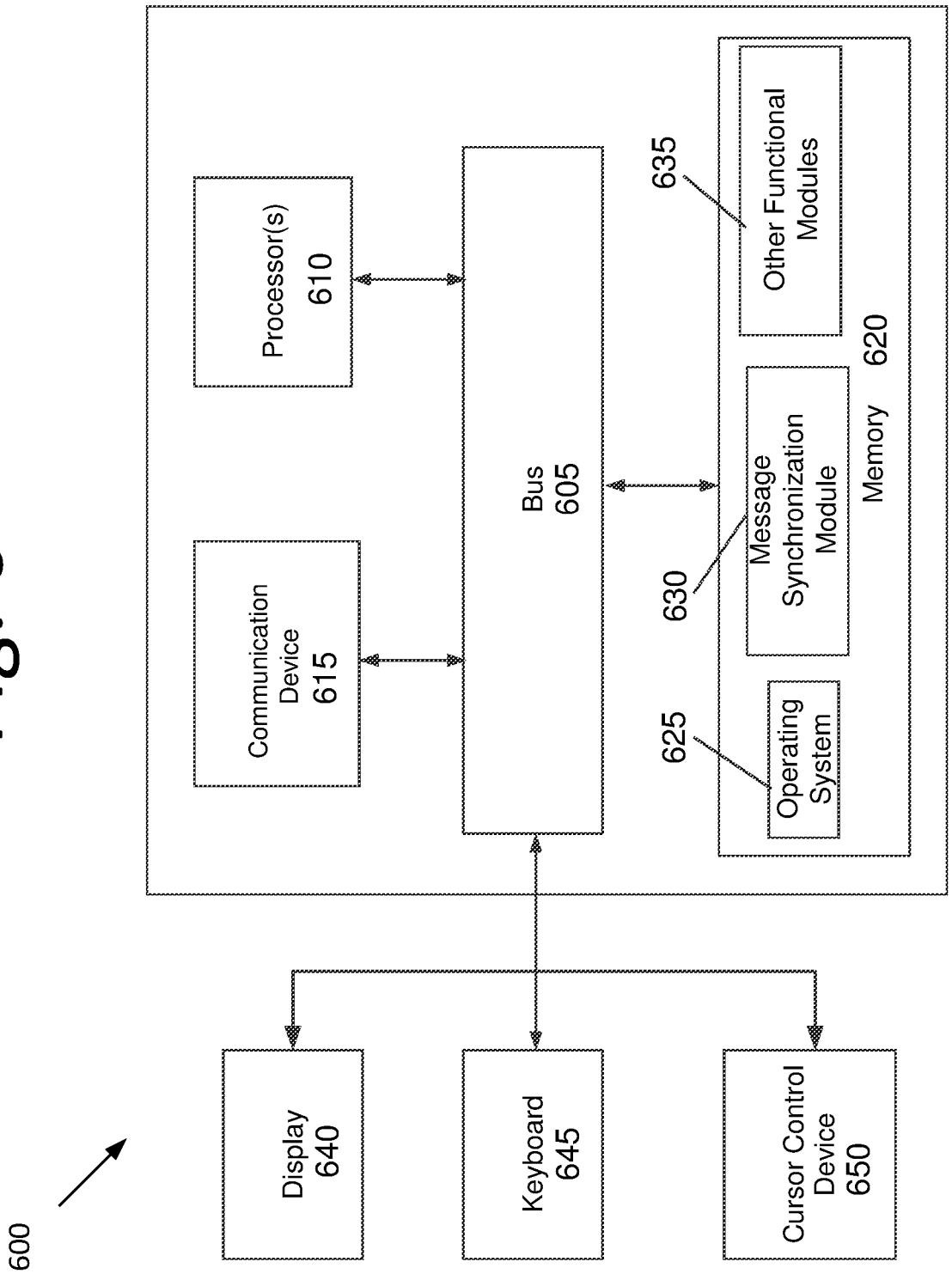
FIG. 6 is a block diagram illustrating a computing system for synchronizing a conversation among multiple webpages in a web browser, according to an embodiment of the present invention.

FIG. 6 is a block diagram illustrating a computing system 600 for synchronizing a conversation among multiple webpages in a web browser, according to an embodiment of the present invention. Computing system 600 may include a bus 605 or other communication mechanism configured to communicate information, and at least one processor 610, coupled to bus 605, configured to process information. At least one processor 610 can be any type of general or specific purpose processor. Computing system 600 may also include memory 620 configured to store information and instructions to be executed by at least one processor 610. Memory 620 can be comprised of any combination of random access memory ("RAM"), read only memory ("ROM"), static storage such as a magnetic or optical disk, or any other type of computer readable medium. Computing system 600 may also include a communication device 615, such as a network interface card, configured to provide access to a network.

The computer readable medium may be any available media that can be accessed by at least one processor 610. The computer readable medium may include both volatile and nonvolatile medium, removable and non-removable media, and communication media. The communication media may include computer readable instructions, data structures, program modules, or other data and may include any information delivery media.

At least one processor 610 can also be coupled via bus 605 to a display 640, such as a Liquid Crystal Display ("LCD"). Display 640 may display information to the user, such as a chat conversation in a webpage. A keyboard 645 and a cursor control unit 650, such as a computer mouse, may also be coupled to bus 605 to enable the user to interface with computing system 600.

According to one embodiment, memory 620 may store software modules that may provide functionality when executed by at least one processor 610. The modules can include an operating system 625 and message synchronization module 630, as well as other functional modules 635. Operating system 625 may provide operating system functionality for computing system 600, and message synchronization module 630 may synchronize messages across multiple tabs, such that the messages that are responded to are displayed. Because computing system 600 may be part of a larger system, computing system 600 may include one or more additional functional modules 635 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process shown in FIG. 5 may be performed, in part, by a computer program, encoding instructions for a nonlinear adaptive processor to cause at least the process described in FIG. 5 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIG. 5, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

One or more embodiments generally provide the user and the commerce website with the ability to continue an ongoing conversation from one webpage in a web browser to another webpage in the web browser. Specifically, one or more embodiments pertain to an apparatus and process for delivering the messages and discarding the messages, which are not responded to. For example, assume that a user opens ten tabs in a web browser for a particular commerce site. Further, assume that each tab includes a webpage that contains a chat widget. In this example, the user, without responding, may receive ten different messages in each chat widget. As soon as the user responds to one of the messages, the messages in the other chat widgets disappear in so far that the only message that is displayed in the ten chat widgets is the message that was responded to. Continuing with this example, if the user refreshes the webpage or webpages, only two messages would be shown—the message to which the user responded to and the user's response message. Each chat widget may include a visual separator. Thus, this is called ephemeral chat.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process, comprising:
   maintaining context of a conversation between a BOT and a user from a chat widget in a first webpage of a web browser to a chat widget in a second webpage of the web browser when the user switches from the first webpage to the second webpage,
   wherein the first webpage of the web browser and the second webpage of the web browser are open at the same time, and
   wherein the maintaining of the context of the conversation comprises
      adding a message to the chat widget on the first webpage, wherein the chat widget on the first webpage is displayed within the first webpage of the web browser and the message being added is from the chat widget on the second webpage that the user responded to; and
      discarding one or more previous messages in the chat widget on the first webpage that are not responded to by the user, allowing the conversation between the BOT and the user to persist on the chat widget on the first webpage while retaining the context of the conversation from the chat widget on the second webpage.

2. The computer-implemented process of claim 1, further comprising:
   loading the chat widget within the webpage, when the webpage is accessed by the user.

3. The computer-implemented process of claim 2, further comprising:
   sending from the web browser a request to a server comprising an application programming interface, when the chat widget is loaded, the request comprises webpage information.

4. The computer-implemented process of claim 3, further comprising:
   receiving the message to be added to the chat widget from a real-time application server in response to the request message being received by the server.

5. The computer-implemented process of claim 4, wherein the message comprises a message hash or a session hash identifying the webpage and placement information identifying location of the message within the chat widget.

6. The computer-implemented process of claim 1, wherein the adding of the message to the chat widget comprises checking if the message belongs to the webpage that is currently being viewed by a user.

7. The computer-implemented process of claim 5, wherein the adding of the message to the chat widget comprises checking if the message should be preceded by a visual separator prior to adding the message into the chat widget.

8. The computer-implemented process of claim 6, wherein the adding of the message to the chat widget comprises adding the visual separator within the chat widget prior to inserting the message, showing a change of context while continuing the conversation from the other chat widget of the other webpage.

9. A computer-implemented process for synchronizing messages among a plurality of webpages in a web browser, comprising:
   displaying a separate chat widget for each of the plurality of webpages opened in the web browser, wherein the separate chat widget comprises one or more messages pertaining to a corresponding webpage and each of the plurality of webpages are opened in the web browser at the same time; and
   maintaining the one or more messages between a BOT and a user from a chat widget in a first webpage of the web browser to a chat widget in a second webpage of the web browser when the user switches from the first webpage to the second webpage, wherein
   the maintaining of the one or more messages comprises
      when a user responds to a message in a chat widget in the second webpage, discarding the one or more messages in other chat widgets within each of the other plurality of webpages that the user has not responded to, and
      updating the chat widget in the second webpage to include the user response message and a visual separator, thereby synchronizing messages among the separate chat widget in each of the plurality of webpages in the web browser.

10. The computer-implemented process of claim 9, further comprising:
loading the chat widget for each of the plurality of webpages that are opened in a web browser, and listening for the one or more messages from a real-time messaging server.

11. The computer-implemented process of claim 10, further comprising:
upon loading of the chat widget in each of the plurality of webpages, transmitting to a server context information of each of the plurality of webpages that are opened in the web browser.

12. The computer-implemented process of claim 11, further comprising:
receiving at the web browser a message from the real-time application server, the message comprises a session identifier unique to a webpage.

13. The computer-implemented process of claim 12, wherein the session identifier is used to create a session for the webpage, and the session dictates the manner in which the message should be displayed along with metadata.

14. The computer-implemented process of claim 12, further comprising:
identifying the webpage that the received message belongs to by checking a message hash or a session hash within the received message.

15. The computer-implemented process of claim 14, further comprising:
determining whether the visual separator should be inserted within the chat widget.

16. A computer-implemented process for synchronizing messages among a plurality of webpages in a web browser, comprising:
maintaining the messages between a BOT and a user when the user switches from chat widget in a first webpage of a web browser to chat widget in a second webpage of the web browser, wherein
the first webpage of the web browser and the second webpage of the web browser are open at the same time, and
the maintaining of the one or more messages comprises
checking if a message belongs to the chat widget in the second webpage that is currently being viewed by a user;
checking if the message should be preceded by a visual separator prior to insertion of the message into a chat widget in the second webpage; and
adding the message to a chat widget within each of the plurality of webpages, when the message belongs to the chat widget in the second webpage, and discarding previous message or messages in the chat widget that are not responded to by the user.

17. The computer-implemented process of claim 16, wherein the adding of the message to the chat widget comprises inserting the visual separator prior to the inserting of the message to retain context of the conversation from another webpage.

18. The computer-implemented process of claim 16, wherein the visual separator identifies a change in topic.

* * * * *